US008082239B2

(12) United States Patent
Yang et al.

(10) Patent No.: US 8,082,239 B2
(45) Date of Patent: Dec. 20, 2011

(54) DEFINING SUB-CUBE SCOPE BASED UPON A QUERY

(75) Inventors: Xiaohong Yang, Sammamish, WA (US); Luming Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/025,696

(22) Filed: Feb. 4, 2008

(65) Prior Publication Data

US 2009/0198663 A1 Aug. 6, 2009

(51) Int. Cl.
*G06F 17/30* (2006.01)
(52) U.S. Cl. .................. 707/705; 707/600; 707/737
(58) Field of Classification Search .................. 707/3–4, 707/100–102, 705, 600, 737
See application file for complete search history.

(56) References Cited

U.S. PATENT DOCUMENTS

| | | | |
|---|---|---|---|
| 5,799,300 A * | 8/1998 | Agrawal et al. ................. | 1/1 |
| 6,108,647 A * | 8/2000 | Poosala et al. .................. | 1/1 |
| 6,477,536 B1 | 11/2002 | Pasumansky et al. | |
| 6,484,179 B1 * | 11/2002 | Roccaforte ................. | 707/737 |
| 6,636,870 B2 * | 10/2003 | Roccaforte ..................... | 1/1 |
| 6,778,996 B2 * | 8/2004 | Roccaforte .................. | 707/600 |
| 6,917,940 B1 | 7/2005 | Chen et al. | |
| 6,980,980 B1 | 12/2005 | Yeh | |
| 7,660,811 B2 * | 2/2010 | Netz et al. ..................... | 1/1 |
| 2004/0103092 A1 * | 5/2004 | Tuzhilin et al. ................ | 707/3 |
| 2004/0122646 A1 | 6/2004 | Colossi et al. | |
| 2004/0237029 A1 | 11/2004 | Medicke et al. | |
| 2005/0278290 A1 | 12/2005 | Bruce et al. | |
| 2006/0010139 A1 * | 1/2006 | Netz et al. .................... | 707/100 |
| 2006/0085444 A1 | 4/2006 | Sarawgi et al. | |
| 2006/0218157 A1 | 9/2006 | Sourov et al. | |
| 2006/0229057 A1 | 10/2006 | Farrugia et al. | |
| 2007/0022120 A1 | 1/2007 | Huang et al. | |
| 2007/0118516 A1 * | 5/2007 | Li et al. ............................. | 707/4 |
| 2007/0203933 A1 | 8/2007 | Iversen et al. | |
| 2008/0288524 A1 * | 11/2008 | Dumitru et al. ............... | 707/102 |

FOREIGN PATENT DOCUMENTS

WO WO2005106711 A1 11/2005

OTHER PUBLICATIONS

Malcolm, "Business Intelligence in SQL Server 2008", Aug. 2007, Microsoft Corporation, pp. 16.
Pay, "DB2 Cube Views Version 8.2 Best Practices", IBM, Feb. 10, 2005, pp. 1-11.
Soni, "OLAP Distinct Counts and Performance Analysis", Microsoft Corporation, 2007, pp. 1-23.

\* cited by examiner

*Primary Examiner* — Sheree Brown
(74) *Attorney, Agent, or Firm* — Hope Baldauff Hartman, LLC

(57) ABSTRACT

Technologies are described herein for defining the scope of a sub-cube based upon a database query. A request is received to perform a query of a multi-dimensional database, such as a cube, stored at a server computer. In response to the request, the scope for a sub-portion, called a sub-cube, of the multi-dimensional database is determined based upon the query. The scope of the sub-cube may be determined by identifying the minimum sub-portion of the cube necessary to perform the query. Once the scope has been determined, the sub-cube is generated at the server computer and transmitted to a client computer. The client computer stores the sub-cube locally and performs the requested database query on the sub-cube stored at the client computer. A user interface may be provided through which a user can modify the scope of the sub-cube determined based upon the query.

14 Claims, 9 Drawing Sheets

DEFINE CUSTOM SUBCUBE DEFINITION FOR ASSIGNMENTS

SELECT THE MEMBERS FOR EACH DIMENSION FOR THE SELECTED MODEL USED IN THE FORM TEMPLATE TO DOWNLOAD WHEN OFFLINE CUBES ARE CREATED FOR ASSIGNMENTS USING THIS FORM TEMPLATE.

[RESORTMGT].[OPEX MODEL]

| DIMENSION | HIERARCHY | VALUE |
|---|---|---|
| ACCOUNT | ALL | ALL |
| BUSINESSDRIVER | ALL | ALL |
| BUSINESSPROCESS | ALL | ALL |
| CURRENCY | ALL | ALL |
| DESTINATIONCURRENCY | ALL | ALL |
| ENTITY | ALL | ALL |
| EXCHANGERATE | ALL | ALL |
| FLOW | ALL | ALL |
| INTERCOMPANY | ALL | ALL |

RESET DEFAULTS     CREATE SAMPLE SUBCUBE

OK     CANCEL

500C — DEFINE DIMENSION SELECTION

SELECT HIERARCHIES AND MEMBERS FOR THE ACCOUNT DIMENSION IN THE OFFLINE CUBE.

○ SELECT ALL — 502D
● DEFINE SELECTION — 502E

| SELECTED | HIERARCHY | VALUE |
|---|---|---|
| ☑ | ACCOUNT_CLASSIFICATION | ALL |
| ☑ | ACCOUNTCLASSIFICATIONMEMBERID | ALL |
| ☑ | ACCOUNTTYPEMEMBERID | ALL |
| ☑ | ACCOUNTTYPENAME | ALL |
| ☑ | ALLMEMBERS | ALL |
| ☑ | CONSOLIDATED | ALL |
| ☑ | CONVERTED | ALL |
| ☑ | CORPORATE | ALL |
| ☑ | DEBIT_CREDIT | ALL |
| ☑ | DEBITCREDITMEMBERID | ALL |
| ☑ | INTERCOMPANY | ALL |
| ☑ | MEMBERDESCRIPTION | ALL |

502F (checkboxes column), 502G (arrows column)

OK — 504
CANCEL — 506

DEFINING SUB-CUBE SCOPE BASED UPON A QUERY

BACKGROUND

Multi-dimensional databases (also known as "cubes" or Unified Dimension Models ("UMDs")) have become an integral part of the business modeling and forecasting efforts of many corporations. Unlike relational databases, which provide only a relatively flat two-dimensional view of data, multi-dimensional databases typically provide many more dimensions of abstraction. Multi-dimensional databases also provide full support for representing hierarchies and combinations of hierarchies and typically provide functionality for making complex calculations based on multiple dimensions of data and relationships defined within the data.

In a typical on-line analytical processing ("OLAP") system, a multi-dimensional database is stored on a server computer and is accessed through a reporting tool executing on a client device. In order to access the multi-dimensional database in such a system, the client device must be on-line and capable of establishing a connection to the server computer. In order to address this limitation, some OLAP systems are configured to copy a portion of the multi-dimensional database to the client device. The reporting tool executing on the client device can then utilize the portion of the multi-dimensional database stored on the client device rather than the multi-dimensional database stored on the server. Locally caching the portion of the multi-dimensional database allows the client device to access the database even when off-line and improves the performance of both the client device and the server computer.

In order to use a locally stored portion of a multi-dimensional database, a user must define the portion of the multi-dimensional database that is to be copied from the server computer to the client device. Previous methods for defining the portion of the multi-dimensional database to be copied to the client device have been manual processes, which can be tedious and time consuming. Moreover, these manual processes often require a user to possess an understanding of the structure of the multi-dimensional database. Most users, however, do not posses this knowledge. As a result, previous methods for defining the portion of a multi-dimensional database to be copied to a client device are often complex and frustrating to users.

It is with respect to these considerations and others that the disclosure made herein is presented.

SUMMARY

Technologies are described herein for defining the portion of a multi-dimensional database to be copied to a client device. In particular, as will be described in greater detail below, a database query is utilized to determine the portion of the multi-dimensional database to be copied to the client device. This frees a user from having to perform a tedious and time consuming manual process to define the portion of the multi-dimensional database to copy and also from having to understand the structure of a multi-dimensional database.

According to one aspect presented herein, a request is received to perform a query of a multi-dimensional database, such as a cube, stored at a server computer. The query may comprise a multi-dimensional expression ("MDX") query or other type of database query. In response to receiving the request, the scope for a sub-portion of the multi-dimensional database, referred to herein as a "sub-cube", is determined based upon the query. For instance, the scope of the sub-cube may be determined by identifying the minimum sub-portion of the cube necessary to perform the query.

Once the scope of the sub-cube has been determined based upon the database query, the sub-cube is generated at the server computer and transmitted to a client device, such as a client computer. The client computer stores the sub-cube locally and performs the requested database query on the sub-cube stored at the client computer. In this manner, a user is not required to participate in the process of defining the scope of the sub-cube. However, in one implementation, a user interface is provided through which a user can modify the scope of the sub-cube determined based upon the query before the sub-cube is generated by the server computer and transmitted to the client computer.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5D are screen display diagrams showing an illustrative user interface for modifying the scope of a sub-cube in one embodiment presented herein.

DETAILED DESCRIPTION

Figure 1:
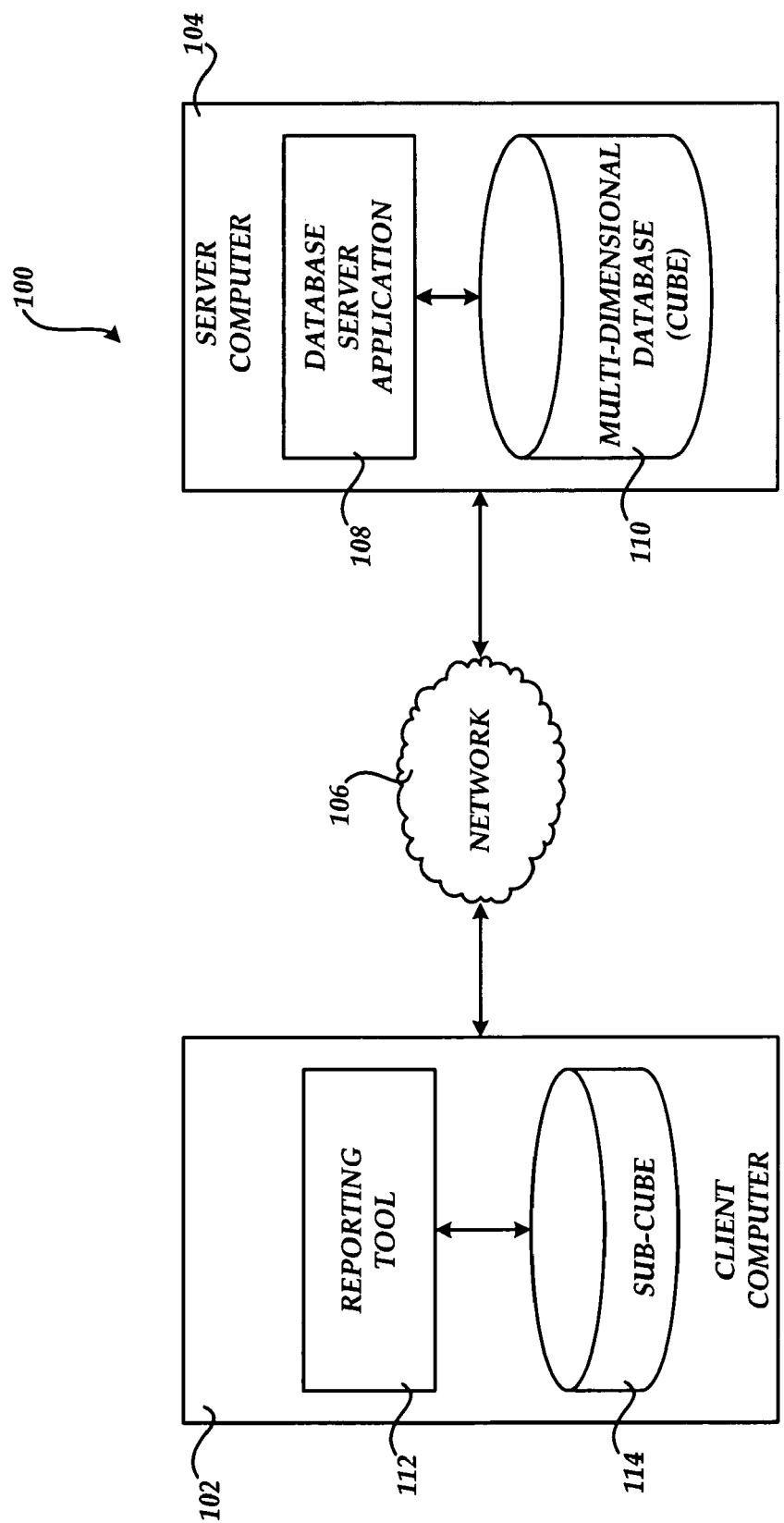
FIG. 1 is a network diagram showing aspects of an illustrative operating environment and several software components provided by the embodiments presented herein.

The following detailed description is directed to concepts and technologies for determining the scope of a sub-cube based upon a database query. Through the use of the technologies and concepts presented herein, the scope of a sub-cube can be determined based upon a database query without any user involvement. Once the scope of the sub-cube has been determined, the sub-cube can be transferred to a client device for off-line execution of the database query against the sub-cube.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for determining the scope of a sub-cube based upon a database query will be described.

Turning now to FIG. 1, details will be provided regarding an illustrative operating environment and several software components provided by the embodiments presented herein. In particular, FIG. 1 shows a simplified view of a multi-dimensional database system 100. The system 100 is merely an illustrative embodiment of a multi-dimensional database system and is not intended to limit the scope of the disclosure presented herein. Any of numerous other implementations of such a system such as, for example, variations of the system 100 are possible, and are intended to fall within the scope of the disclosure presented herein.

In the embodiment shown in FIG. 1, the system 100 includes one or more client devices, such as the client computer 102, a server computer 104, and a network 106 that communicatively couples the client computer 102 and the server computer 104. It should be appreciated that the network 106 may comprise any type of data communications network and that many more network connections may be utilized than illustrated in FIG. 1. Moreover, it should be appreciated that although only one client computer 102 and one server computer 104 have been illustrated in FIG. 1 for simplicity, any number of these computing systems may be utilized together in the manner presented herein.

The server computer 104 comprises a standard server computer configured to execute an appropriate operating system and a database server application 108. The database server application 108 provides functionality for creating and storing a multi-dimensional database 110, which may also be referred to herein as a "cube." The database server application 108 also provides functionality for receiving and processing queries of the multi-dimensional database 110 from the client computer 102. In one implementation, the database server application 108 comprises the SQL SERVER 2000 ANALYSIS SERVICES database server application from MICROSOFT CORPORATION of Redmond, Wash. However, other database server applications from other vendors may also be utilized. It should be appreciated that although a single multi-dimensional database 110 has been illustrated in FIG. 1, the database server application 108 may maintain many such databases. Additional details regarding the structure and form of the multi-dimensional database 110 will be provided below with respect to FIG. 2.

The client computer 102 illustrated in FIG. 1 comprises a standard desktop or laptop computer system capable of executing an operating system and one or more application programs. In particular, according to embodiments, the client computer 102 is operative to store and execute a reporting tool 112. The reporting tool 112 is configured to provide functionality for querying the multi-dimensional database 110 stored at the server computer 104 and analyzing the query results. In one implementation, the reporting tool 112 comprises a spreadsheet application program, such as the EXCEL spreadsheet application program from MICROSOFT CORPORATION, configured to operate in conjunction with the database server application 108 to provide database querying, analysis, and reporting functions. In other embodiments, the reporting tool 112 comprises a plug-in or add-on to a spreadsheet application program capable of providing the functionality described herein. In yet other embodiments, the reporting tool 112 comprises a dedicated standalone application program for interacting with the database server application 108. In each embodiment, the reporting tool 112 provides significant additional functionality not described in detail herein for querying the multi-dimensional database 110 and processing and reporting the query results.

As will be described in greater detail below, the database server application 108 is configured in one embodiment to receive and respond to requests from the reporting tool 112 to generate a sub-cube 114. The sub-cube 114 comprises any sub-portion of the multi-dimensional database 110. The reporting tool 112 provides instructions to the database server application 108 regarding the scope of the sub-cube 114 that should be generated from the multi-dimensional database 110.

Once the sub-cube 114 has been generated, the server computer 104 transmits the sub-cube 114 to the client computer 102 for storage at the client computer 102. Database queries, such as MDX queries, received at the client computer 102 can then be performed against the sub-cube 114 stored at the client computer 102 rather than against the cube 110 stored at the server computer 104. Because the sub-cube 114 is stored at the client computer 102, the reporting tool 112 can perform database queries on the sub-cube 114 even when the client computer 102 is off-line and not connected to the server computer 104 via the network 106. One methodology for caching a sub-cube 114 at a client device such as the client computer 102 is described in U.S. patent application Ser. No. 11/188,439 (U.S. Patent Publication No. US2007/0022120), filed on Jul. 25, 2005, and entitled "CACHING AND MODIFYING PORTIONS OF A MULTI-DIMENSIONAL DATABASE ON A USER DEVICE," which is assigned to the assignee of the instant patent application and expressly incorporated by reference herein in its entirety.

As will be described in greater detail below, the embodiments presented herein allow the reporting tool 112 to calculate the scope of the sub-cube 114 based upon the contents of a database query. The scope of the sub-cube refers to the portion of the cube 110 that will be included in the sub-cube 114 and may include any sub-portion of the entire cube 110. In one embodiment, the scope of the sub-cube 114 comprises the minimum sub-portion of the cube 110 necessary to perform the query. In this manner, only the portion of the cube 110 necessary to perform the database query is transferred to the client computer 102 in the form of the sub-cube 114. It should be appreciated that the database query may take the form of an MDX query or other type of database query, and may be received from a user, obtained from a workbook or an assignment, or obtained in other ways from other sources. Additional details regarding various processes provided herein for determining the scope of the sub-cube 114 based upon a database query are provided below with respect to FIGS. 2-6.

Figure 2:
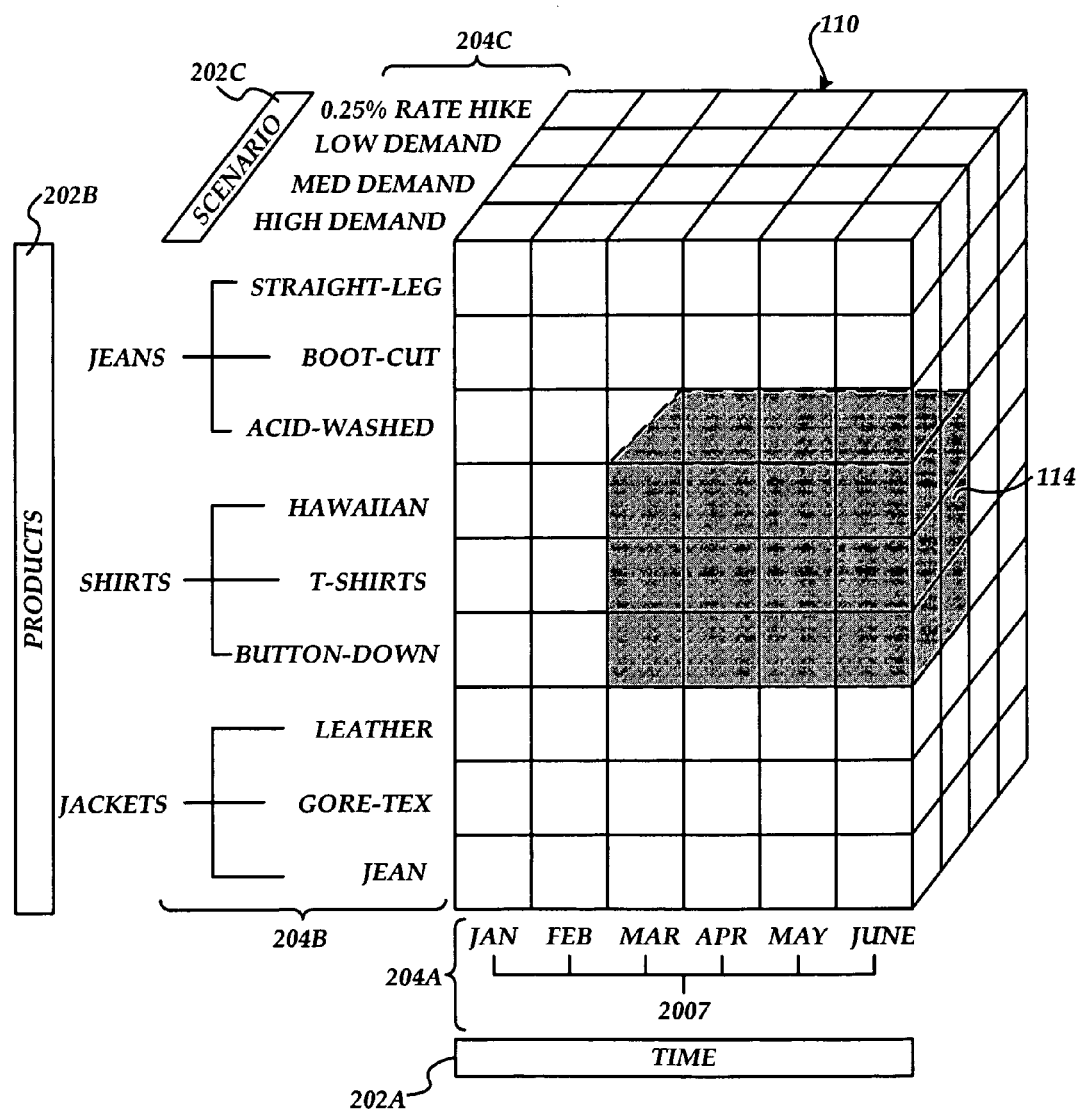
FIG. 2 is a data structure diagram showing a representation of a multi-dimensional database utilized in one embodiment presented herein.

Turning now to FIG. 2, additional details regarding the cube 110 and the sub-cube 114 will be described. In particular, FIG. 2 is a depiction of an illustrative cube 110 and a corresponding sub-cube 114. It should be appreciated that while the cube 110 can be represented as a three-dimensional object, such as that illustrated in FIG. 2, a multi-dimensional database may include more than three dimensions. As a result, a three-dimensional representation such as that shown in FIG. 2 may necessarily ignore or make assumptions about dimensions not depicted.

In the example shown in FIG. 2, the cube 110 has three dimensions 202A-202C. The dimensions shown are time 202A, products 202B, and scenario 202C. Each dimension includes members that may be grouped into sets, referred to herein as member sets. For instance, in the example shown in FIG. 2, the time dimension 202A includes the member set 204A, the products dimension 202B includes the member set 204B, and the scenario dimension 202C includes the member set 204C.

Each of the dimensions 202A-202C can also be arranged according to one or more hierarchies. For instance, in FIG. 2 the member set 204A and the member set 204B have been organized according to hierarchies. Each hierarchy may have multiple levels. A "high" level refers to a level at or near the top of a hierarchy. A "low" level refers to a level at or near the bottom of a hierarchy. Levels within a hierarchy may also be referred to with respect to their relative positions as being a "higher" level or a "lower" level. The bottom level of a hierarchy refers to the lowest level within the hierarchy and may be referred to as the "leaf" level.

As discussed above, the sub-cube 114 may comprise any sub-portion of the cube 110. For example, in the illustrative cube 110 shown in FIG. 2, the scope of the sub-cube 114 includes the members "MAR," "APR," "MAY," and "JUNE" from the time dimension 202A, the member set "SHIRTS" from the products dimension 202B, and the members "MED DEMAND" and "HIGH DEMAND" from the scenario dimension 202C. It should be appreciated that an appropriate database query may be constructed and submitted to the reporting tool 112 to specify the scope of the sub-cube 114. Additional details regarding the various processes provided herein for utilizing a database query to identify the scope of the sub-cube 114 will be provided below with respect to FIG. 3.

Figure 3:
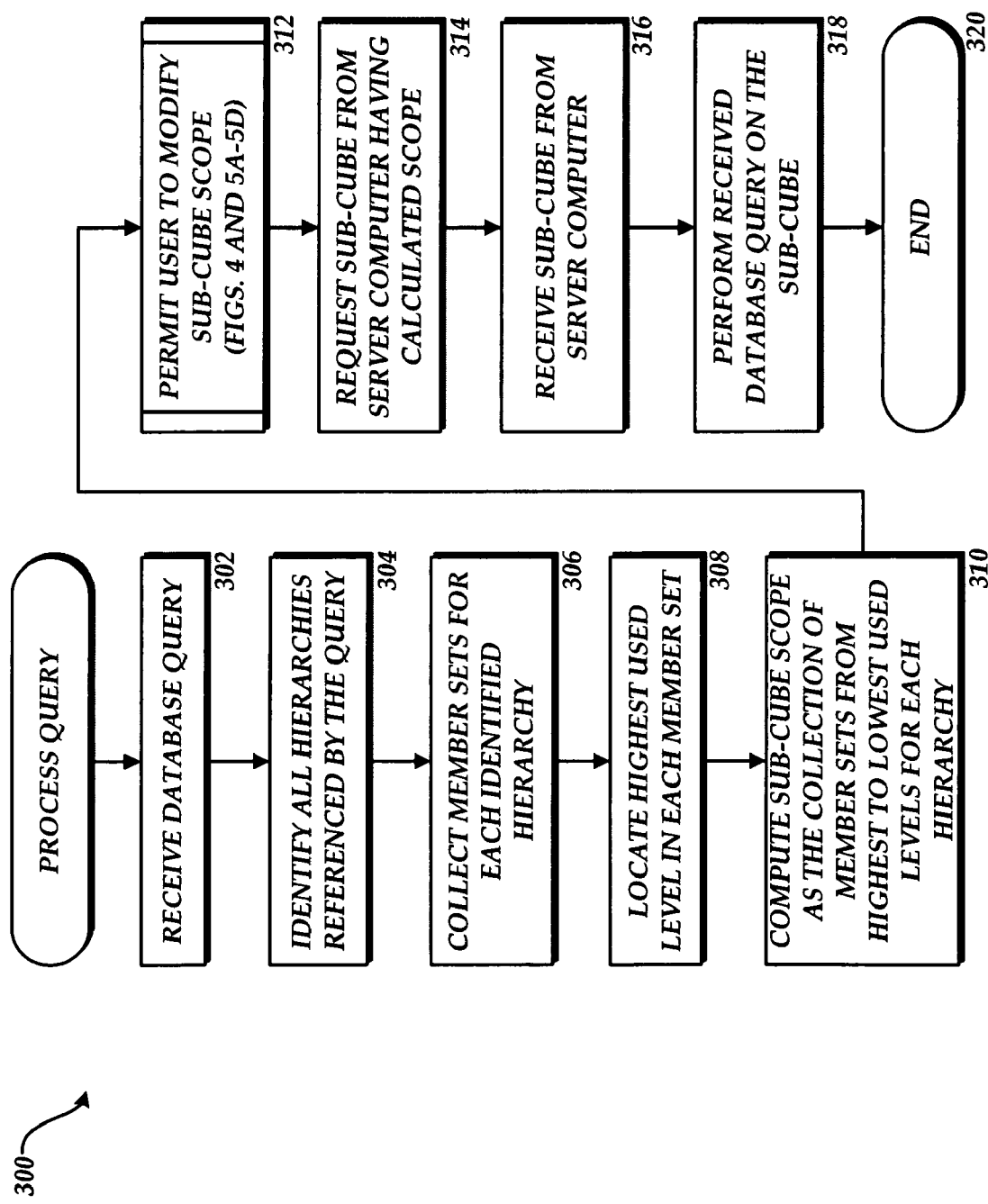
FIG. 3 is a flow diagram showing one illustrative routine for processing a query of a multi-dimensional database in one embodiment presented herein.

Referring now to FIG. 3, additional details will be provided regarding the embodiments presented herein for determining the scope of a sub-cube based upon a database query. In particular, FIG. 3 is a flow diagram illustrating aspects of the operation of the reporting tool 112 for determining the scope of the sub-cube 114 and performing a database query on the sub-cube 114. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the reporting tool 112 receives a database query. As discussed above, the query may comprise an MDX query and may be retrieved from an assignment, a workbook, or received from a user. In embodiments, a Report Definition Language ("RDL") file may be received at operation 302. RDL is an XML-based schema for defining reports. The RDL file may contain the description of a desired data set. In this case, the reporting tool 112 generates the database query, or queries, from the description of the desired data set contained in the RDL file. The RDL file may alternately contain or generate one or more database queries.

In response to receiving the query, the routine 300 continues to operation 304, where the reporting tool 112 identifies the hierarchies in the cube 110 that are referenced by the query. Members of hierarchies that are not referenced by the query are not included in the scope of the sub-cube 114. From operation 304, the routine 300 continues to operation 306.

At operation 306, the reporting tool 112 collects the used member sets within each of the hierarchies referenced by the query. Once the used member sets have been collected, the routine 300 continues to operation 308, where the reporting tool 112 locates the highest used level within each of the used member sets. The routine 300 then continues to operation 310, where the reporting tool 112 computes the scope of the sub-cube 114 as the collection of used member sets from the highest used level to the lowest level within each of the hierarchies referenced by the query. The routine 300 then continues to operation 312.

At operation 312, the reporting tool 112 provides a user interface through which a user may modify the determined scope for the sub-cube 114. FIGS. 4 and 5A-5D, described below, present one illustrative user interface for allowing a user to modify the scope of the sub-cube 114 prior to requesting the sub-cube 114 from the server computer 104. It should be appreciated that the provision of a user interface for modifying the calculated scope of the sub-cube 114 at operation 312 is optional. Once the scope of the sub-cube has been modified at operation 312, the routine 300 continues to operation 314.

At operation 314, the reporting tool 112 requests the sub-cube 114 from the database server application 108. The requested sub-cube 114 has a scope as computed by the reporting tool 112 based upon the database query and possibly modified by a user in the manner described above. In response to receiving such a request from the reporting tool 112, the database server application 108 generates the sub-cube 114 and transmits the sub-cube 114 to the reporting tool 112. The reporting tool 112 receives the sub-cube 114 from the database server application 108 at operation 316 and persists the sub-cube 114 in mass storage that is local to the client computer 102. The routine 300 then continues to operation 318, where the reporting tool 112 performs the requested database query on the sub-cube 114. The reporting tool 112 may also perform other queries and operations on the sub-cube 114. From operation 318, the routine 300 continues to operation 320, where it ends.

The routine 300 illustrated in FIG. 3 processes a single query directed to a single cube 110. It should be appreciated, however, that multiple database queries might reference the cube 110 or other cubes. In this case, the sub-cube scopes referenced by each of the queries are merged to identify a single sub-cube scope. In particular, if a hierarchy is not used in some of the queries, but is used in at least one query, the entire hierarchy is included in the sub-cube scope. If a hierarchy is not used in any of the queries, it is not included in the sub-cube scope. If a hierarchy is used in all of the queries, a union operation is performed of the used member sets from all queries within the hierarchy. Only those members below the highest level used in all of the queries are included within the scope of the sub-cube. In this way, the final calculation of the scope of a sub-cube is based upon the union of all of the scopes of sub-cubes for database queries that query the same cube 110.

Figure 4:
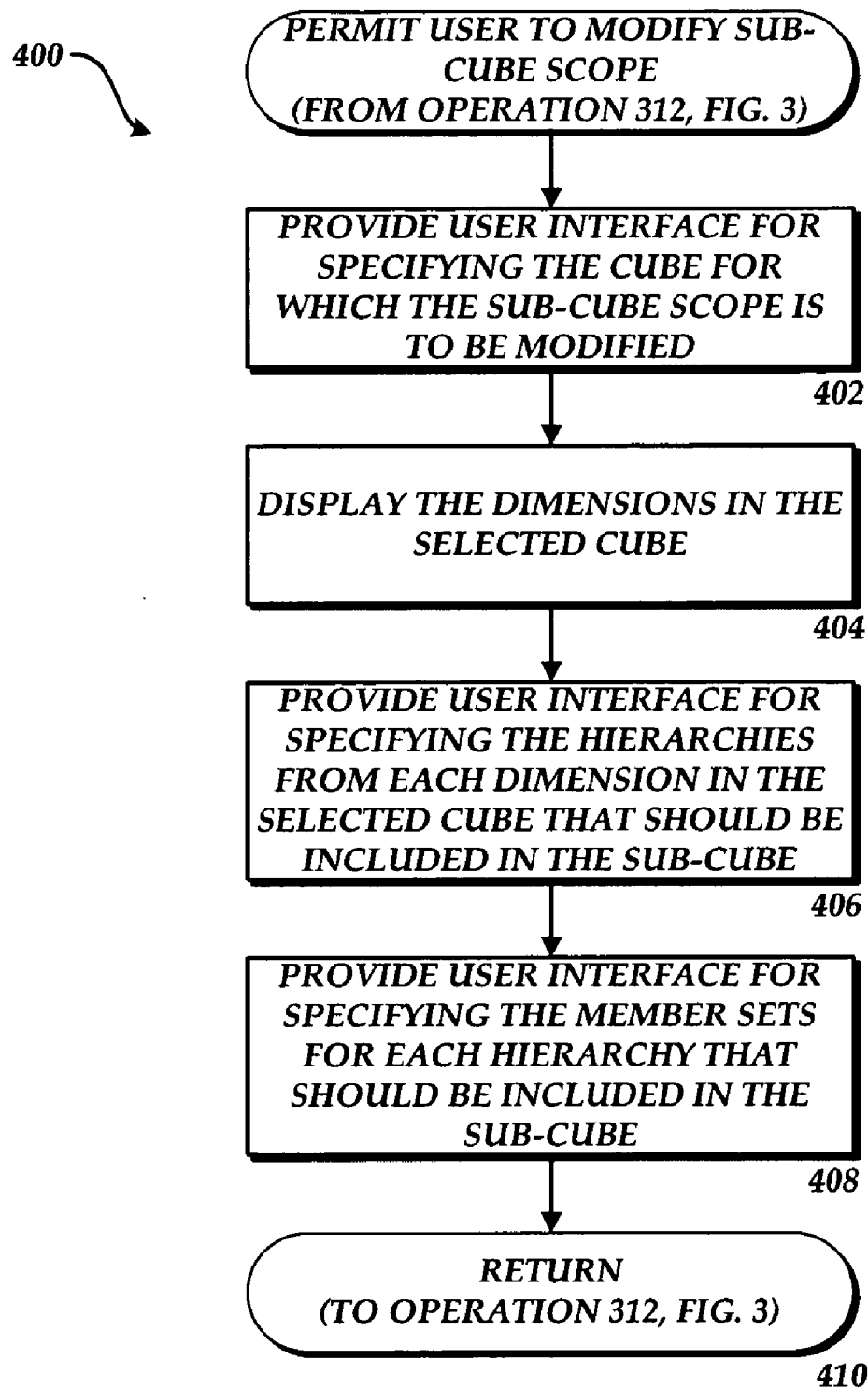
FIG. 4 is a flow diagram showing one illustrative routine for modifying the scope of a sub-cube in one embodiment presented herein.
Figure 5A:
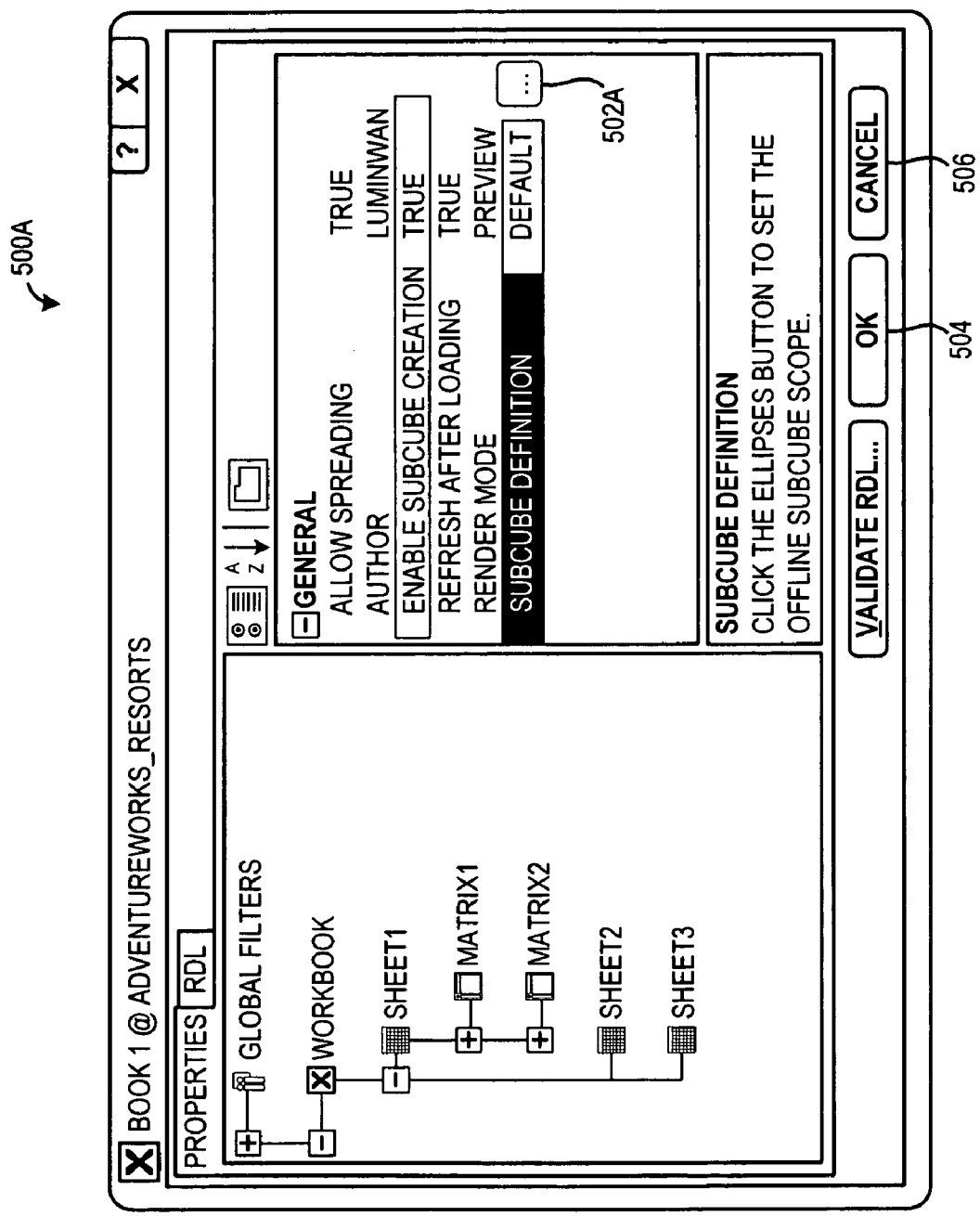
Figure 5D:
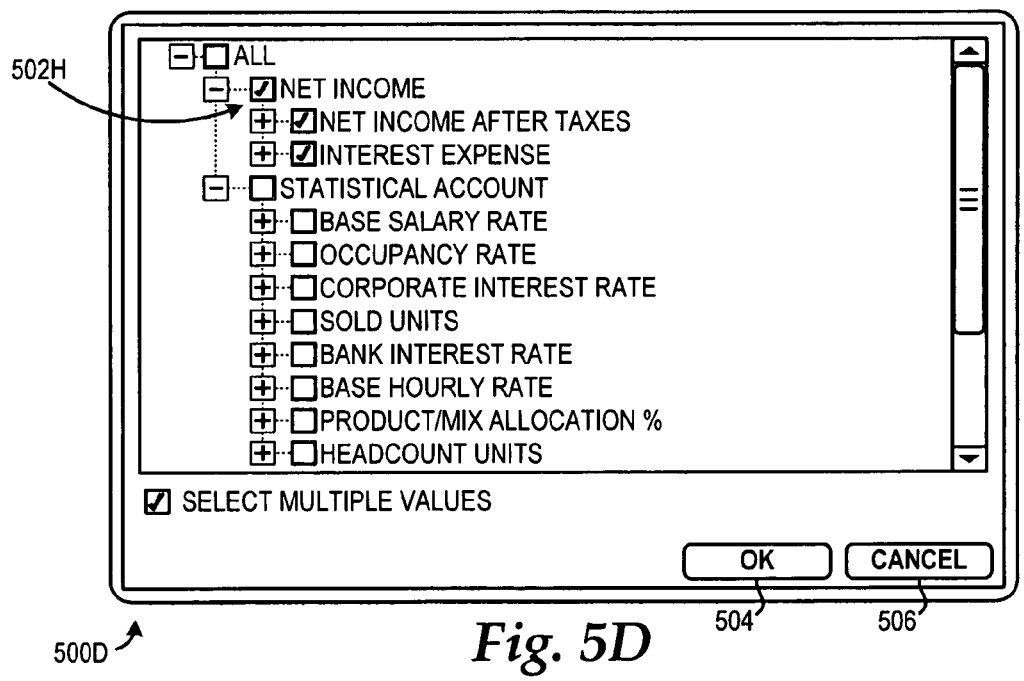

Turning now to FIG. 4, a routine 400 will be described that illustrates one process provided herein for allowing a user to modify the scope of the sub-cube 114 as computed by the reporting tool 112 based upon the database query. FIG. 4 will be described in conjunction with FIGS. 5A-5D, which are screen diagrams showing examples of illustrative user interfaces provided herein for allowing a user to modify the computed sub-cube scope. For example, FIG. 5A shows a screen display 500A generated by the reporting tool 112 in one embodiment through which a user can select a user interface control 502A to request a manual modification of the computed sub-cube scope. Illustrative user interfaces for manually modifying the sub-cube scope are discussed in detail below. Once a user has completed modification of the sub-cube scope, the user select the user interface control 504 to accept the changes to the sub-cube scope or select the user interface control 506 to cancel the changes. Additional details regarding this process are provided below.

The routine 400 begins at operation 402, where the reporting tool 112 provides a user interface through which a user may specify the cube 110 for which the sub-cube scope is to be modified. FIG. 5B shows a screen display 500B generated by the reporting tool 112 in one embodiment for providing such a user interface. In particular, the user interface control 502B may be utilized to specify the cube 110 for which the sub-cube scope is to be modified. Once the desired cube has been selected, the routine 400 continues to operation 404, where the reporting tool 112 displays the dimensions contained in the selected cube 110. This is also illustrated in the screen display 500B. If a user desires to modify the hierarchies or member sets from each hierarchy that are included in the sub-cube scope, the user may select the user interface control 502C. The user may also select the user interface control 504 to accept the changes to the sub-cube scope or select the user interface control 506 to cancel the changes.

If a user selects the user interface control 502C, the routine 400 continues to operation 406, where the reporting tool 112 provides a user interface for specifying the hierarchies from each dimension in the selected cube 110 to be included in the sub-cube 114. FIG. 5C shows an illustrative screen display 500C generated by the reporting tool 112 with such an interface. In particular, the user interface control 502D may be selected to include all of the hierarchies within the dimension in the sub-cube scope. Alternatively, the user interface control 502E may be selected in order to specify individual hierarchies that should or should not be included in the sub-cube scope. In this regard, a list of hierarchies is provided in one embodiment with a user interface control adjacent to each for indicating whether the respective hierarchy should be included in the sub-cube scope. For instance, the user interface control 502F may be selected or deselected to include or exclude the hierarchy entitled "Account_Classification" in the sub-cube scope.

The user interface control 502G may also be selected to specify the member sets for each hierarchy that should be included in the sub-cube scope. In response to such a selection, the routine 400 continues from operation 406 to operation 408, where the reporting tool 112 presents the screen display 500D shown in FIG. 5D for specifying the member sets for the selected hierarchy that should be included in the sub-cube scope. For example, in one embodiment each of the member sets are listed and a user interface control corresponding to each member set may be selected or deselected to include or exclude the member set from the sub-cube scope. In the example shown in FIG. 5D, the user interface control 502H may be selected or deselected to include or exclude the member set named "Net Income" from the sub-cube scope. A user may select the user interface control 504 to accept the changes to the sub-cube scope or select the user interface control 506 to cancel the changes. Once the user has completed the modification of the sub-cube scope, the routine 400 returns to operation 312, described above with reference to FIG. 3.

Figure 6:
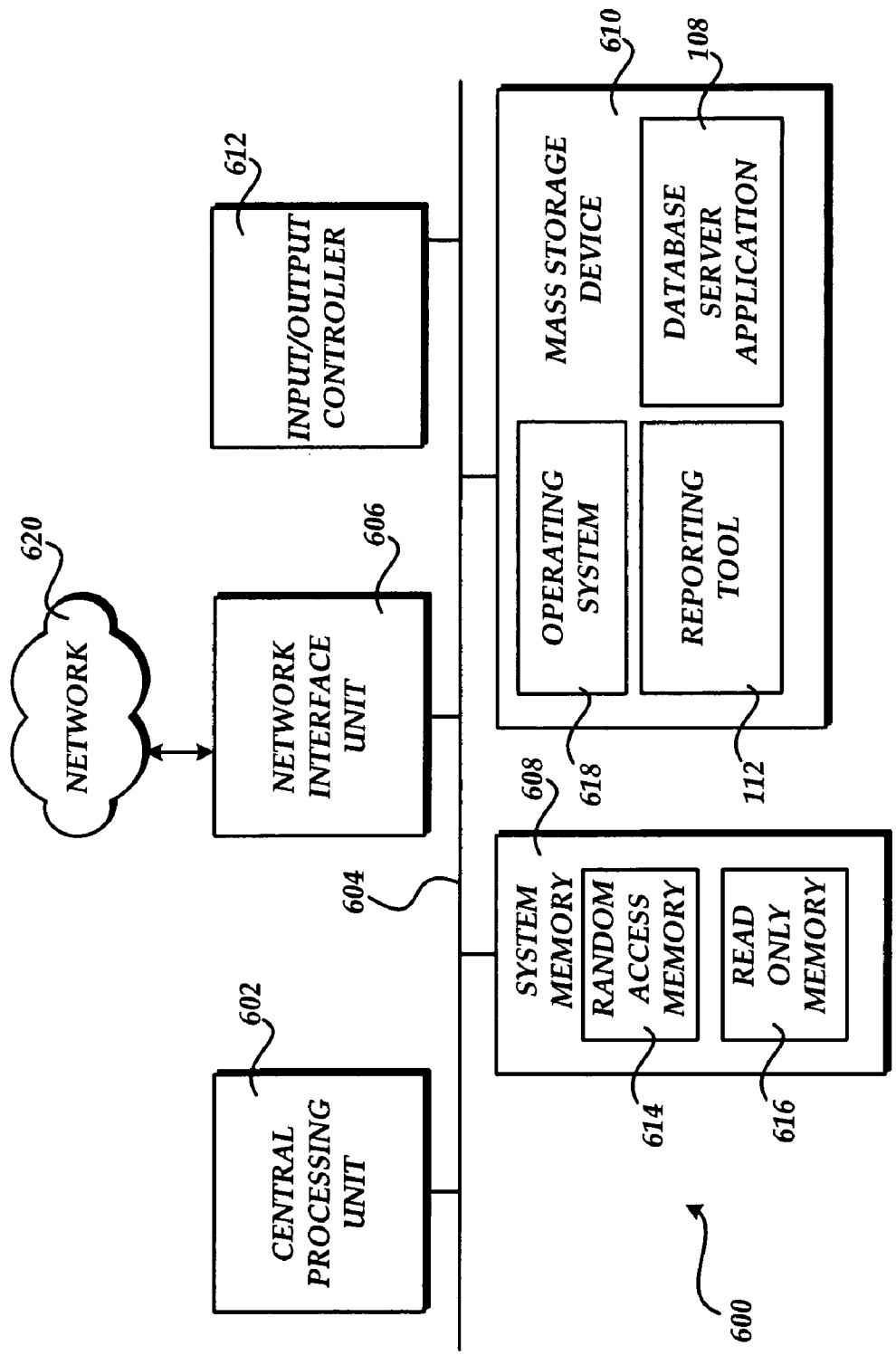
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for defining the scope of a sub-cube based upon a query in the manner presented above. The computer architecture shown in FIG. 6 illustrates a conventional desktop, laptop, or server computer and may be utilized to execute any aspects of the software components described herein as executing on the client computer 102 or the server computer 104.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the reporting tool 112 or the database server application 108, each of which was described in detail above with respect to FIGS. 1-5D. The mass storage device 610 and the RAM 614 may also store other types of program modules.

Based on the foregoing, it should be appreciated that technologies for determining the scope of a sub-cube based upon a database query are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
   receiving, at a client computer, a request to perform a query of a cube stored at a server computer, wherein the cube comprises one or more dimensions, each of the dimensions containing one or more hierarchies, each of the hierarchies containing one or more used member sets and having one or more levels;
   in response to receiving the request, determining a scope of a sub-cube of the cube based upon the query by identifying one or more of the hierarchies referenced by the query, collecting each of the used member sets within each of the hierarchies referenced by the query, locating a highest used level within each of the used member sets within each of the hierarchies referenced by the query, and setting the scope of the sub-cube of the cube as a collection of used member sets from the highest used level to a lowest level within each of the hierarchies referenced by the query;
   generating instructions for copying the sub-cube having the scope determined from the server computer to the client computer;
   transmitting to the server computer the instructions for copying the sub-cube;
   receiving and storing the sub-cube at the client computer; and
   performing the query on the sub-cube stored at the client computer.

2. The method of claim 1, wherein determining the scope of a sub-cube of the cube based upon the query comprises identifying a minimum sub-portion of the cube that can be stored at the client computer for performance of the query.

3. The method of claim 2, further comprising providing a user interface for modifying the scope of the sub-cube.

4. The method of claim 3, wherein providing a user interface for modifying the scope comprises providing a user interface for specifying one or more hierarchies within one or more dimensions of the cube that are to be included in the sub-cube.

5. The method of claim 4, wherein providing a user interface for modifying the scope further comprises providing a user interface for specifying one or more member sets within each of the one or more hierarchies that are to be included in the sub-cube.

6. A computer storage medium having computer executable instructions stored thereon that, when executed by a computer, cause the computer to:
   receive a request at a client computer to perform a query on a multi-dimensional database stored at a server computer, wherein the multi-dimensional database comprises one or more dimensions, each of the dimensions containing one or more hierarchies, each of the hierarchies containing one or more used member sets and having one or more levels;
   in response to receiving the request at the client computer, identify a sub-portion of the multi-dimensional database based upon the query by identifying one or more of the hierarchies referenced by the query, collecting each of the used member sets within each of the hierarchies referenced by the query, locating a highest used level within each of the used member sets within each of the hierarchies referenced by the query, and setting the scope of the sub-portion of the multi-dimensional database as a collection of used member sets from the highest used level to a lowest level within each of the hierarchies referenced by the query;
   generate, based upon the query, instructions for obtaining the sub-portion of the multi-dimensional database from the server computer;
   transmit the instructions to the server computer;
   copy the sub-portion of the multi-dimensional database to the client computer by receiving and storing the sub-portion of the multi-dimensional database received from the server computer; and
   perform the query on the sub-portion of the multi-dimensional database stored at the client computer.

7. The computer storage medium of claim 6, wherein the multi-dimensional database comprises a cube, wherein the sub-portion of the multi-dimensional database comprises a sub-cube of the cube, and wherein the query comprises a multi-dimensional expression (MDX).

8. The computer storage medium of claim 6, wherein identifying a sub-portion of the multi-dimensional database based upon the query comprises identifying a minimum sub-portion of the multi-dimensional database that can be provided to the client computer for performance of the query.

9. The computer storage medium of claim 7 having further computer executable instructions stored thereon that, when executed by a computer, cause the computer to provide a user interface for modifying the determined scope of the sub-cube.

10. The computer storage medium of claim 9, wherein providing a user interface for modifying the scope comprises providing a user interface for specifying one or more hierarchies within one or more dimensions of the cube that are to be included in the sub-cube.

11. The computer storage medium of claim 10, wherein providing a user interface for modifying the scope further comprises providing a user interface for specifying one or more member sets within each of the one or more hierarchies that are to be included in the sub-cube.

12. A system for performing a multi-dimensional expression (MDX) on a cube, the system comprising:

a server computer configured to store the cube and to receive and process MDXs of the cube, wherein the cube comprises one or more dimensions, each of the dimensions containing one or more hierarchies, each of the hierarchies containing one or more used member sets and having one or more levels; and a client computer operative to execute a reporting tool, the reporting tool configured to receive a request to perform the MDX of the cube, to identify a scope of a sub-cube of the cube based upon the MDX by identifying one or more of the hierarchies referenced by the MDX, collecting each of the used member sets within each of the hierarchies referenced by the MDX, locating a highest used level within each of the used member sets within each of the hierarchies referenced by the MDX, and setting the scope of the sub-cube of the cube as a collection of used member sets from the highest used level to a lowest level within each of the hierarchies referenced by the MDX, to request the sub-cube of the scope identified from the server computer, to receive the sub-cube of the cube from the server computer, to store the sub-cube of the cube at the client computer, and to perform the MDX on the sub-cube of the cube stored at the client computer.

13. The system of claim 12, wherein identifying the scope of the sub-cube of the cube based upon the MDX comprises identifying a minimum sub-cube that can be provided to the client computer for performance of the MDX.

14. The system of claim 13, wherein the reporting tool is further configured to provide a user interface for modifying the scope of the sub-cube of the cube.

* * * * *